March 11, 1930.  E. CASKEY  1,750,212
ROTARY PUMP
Original Filed Aug. 11, 1925  2 Sheets-Sheet 1

Inventor
Emmett Caskey
By Philip A. H. Sewell
Attorney

March 11, 1930.   E. CASKEY   1,750,212
ROTARY PUMP
Original Filed Aug. 11, 1925   2 Sheets-Sheet 2
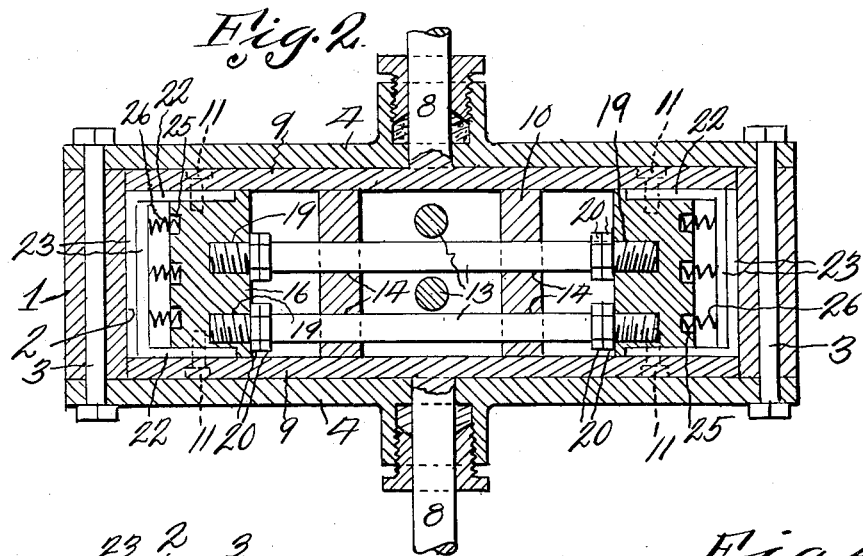
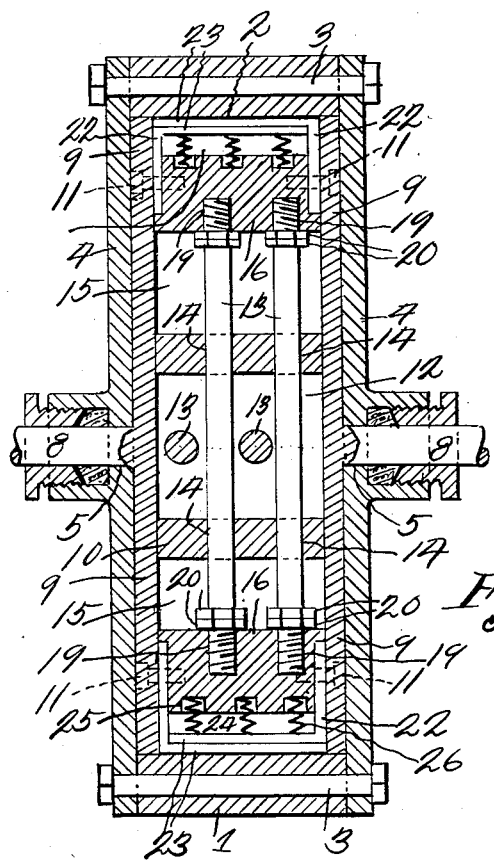
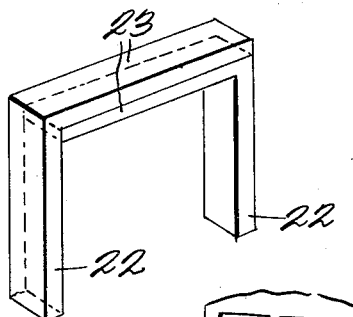
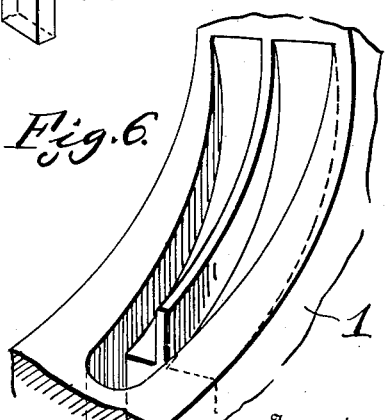
Inventor
Emmett Caskey Patented Mar. 11, 1930

1,750,212

UNITED STATES PATENT OFFICE

EMMETT CASKEY, OF COUNCIL BLUFFS, IOWA

ROTARY PUMP

Application filed August 11, 1925, Serial No. 49,504. Renewed June 27, 1929.

The invention relates to rotary pumps and has for its object to provide a rotary pump of the abutment type wherein the rotor is mounted in a chamber of the casing, and the abutments which are connected together by pairs of parallel connecting rods are positively guided by the parallel connecting rods during the movement of the rotor and prevented from a twisted action in the recesses in the rotor.

A further object is to mount the rotor within the pump chamber in a manner whereby, during its rotation, any of the chords of the cylinder, passing through the axis of the rotor will be of uniform length, and the magnitude of the longitudinal travel of the abutments and their connecting rods will be in proportion to the number of degrees passed over during any part of its rotation. The orbit of the center of the connecting rods being slightly elliptical, forms many centers for the rotor during its rotation for the abutments to act on the fluid during a pumping operation, consequently an increased volume of pumping power is obtained.

A further object is to slidably mount the abutments in recesses in the rotor between drive plates connected to opposite sides of the rotor and to connect the abutments together by parallel connecting rods, slidably mounted in bearings of the rotor and having their ends provided with right and left hand threads threaded into the abutments, thereby allowing the rods to be threaded into the abutments by a rotation thereof in one direction after they have been placed in the rotor bearings.

A further object is to provide L-shaped packing members in channels of the abutments and having arms overlapped, thereby insuring a positive guiding of both packing members in relation to each other, and also to provide coiled springs interposed between the overlapped ends of the packing members and the bottom of the channels in the abutments for normally forcing said packing members outwardly into engagement with the inner periphery of the pump cylinder.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 2 is a horizontal sectional view through the pump taken on line 2—2 of Figure 1.

Figure 3 is a vertical transverse sectional view through the pump taken on line 3—3 of Figure 1.

Figure 4 is a perspective view of the packing member.

Figure 6 is a perspective view of a portion of the cylinder showing one of the ports.

Figure 1:
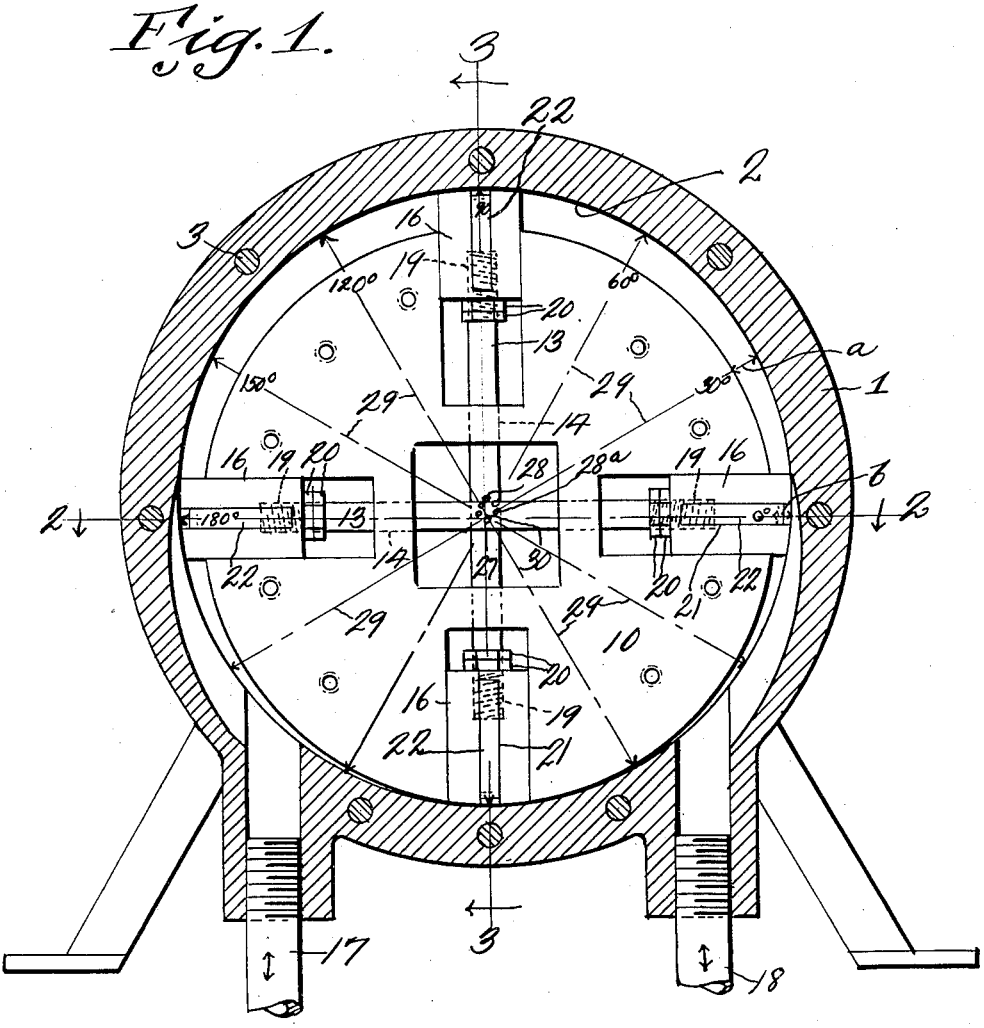
Figure 1 is a vertical longitudinal sectional view through the pump.
Figure 5:
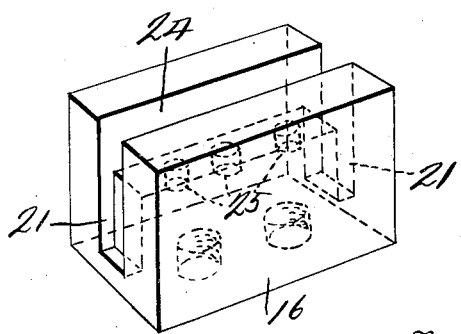
Figure 5 is a perspective view of one of the abutments.

Referring to the drawing, the numeral 1 designates the annular casing of the pump, the inner periphery 2 of which is a true circle, and is transversely straight. Secured to opposite sides of the casing 1 by means of bolts 3 are plates 4, in bearings 5 of which are rotatably mounted shafts 8, the inner ends of which are provided with plates 9, which are secured to opposite sides of the rotor 10 by means of bolts 11, therefore it will be seen that when the shafts 8 are rotated the pump rotor 10 will be rotated therewith. The rotor 10 is provided with a centrally disposed opening 12, and with right angularly disposed pairs of parallel connecting rods 13, which connecting rods are slidably mounted in the bearings 14 of the rotor, and cross each other at the axis of the rotor. Slidably mounted in the recesses 15 in the rotor 10, and between the plates 9 are abutments 16, which abutments engage the inner periphery 2 of the casing 1, during the rotation of the rotor, thereby sucking fluid into the cylinder through the supply pipe 17, and discharging the fluid through a discharge pipe 18. It is obvious either pipe can be a suction or discharge pipe as desired. The connecting rods 13 having their opposite ends reversely threaded into the abutments at 19, therefore it will be seen that it will only be necessary in assembling the rotor and abutment to place the connecting rods 13 through the bearings 14 and then place the abutments in position and rotate the rods 13, which will thread the ends of the rods into the abutments. The rods are preferably provided with lock nuts 20 for securely holding the abutments thereon.

Abutments 16 have their opposite sides provided with channels 21, in which are disposed the arms 22 of L-shaped packing members. The arms 23 of the packing members overlap and are disposed in the transverse channels 24 of the abutments, thereby providing a relatively wide wearing surface and a rigid one for cooperating with the inner periphery 2 of the casing. Interposed between the inner arms 23 and the bottoms of recesses 25 in the bottoms of the channels 24 are coiled springs 26, which coiled springs are expansive ones, consequently force the arms 23 outwardly, thereby insuring a close packing engagement at all times.

The center 27 of the rotor is eccentric in relation to the center 28 of the cylinder casing or chamber, and is so proportioned that in any part of the rotor revolution any of the chords 29 of the cylinder which pass through the center or axis 27 of the rotor, will be of uniform length and the magnitude of the longitudinal travel of the connecting rods 13, consequently of the abutments 15 will be in proportion to the number of degrees passed over during any part of its revolution. The orbit of the center 27 is slightly elliptical as shown at 30 in Figure 1, and it is the form of the orbit required to conform to above conditions that allows the rotor to operate from many centers and from a constantly changing center, thereby allowing maximum pumping efficiency to be obtained. The elliptical orbit 30 is established by the difference between the distance $a$ in Figure 1 and the distance $b$ in Figure 1, being the space from the center 27 of the rotor on the particular degree line, for instance at $28^a$ in Figure 1, other measurements being taken accordingly until the elliptical orbit is formed.

From the above it will be seen that a rotary pump is provided wherein the center of the drive of the rotor is a constantly changing one in an elliptical orbit, thereby forming means whereby the maximum pumping efficiency is obtained.

The cylinder 1 at opposite sides thereof is provided with spaced ports $1^a$, which extend downwardly and taper in width and depth below the horizontal positions of the abutments 16, whereby a cross sectional area is obtained between the rotor and the bottoms of the ports $1^a$, substantially the same as the cross sectional area between the upper side of the rotor and the inner periphery 2 of the cylinder thereby preventing back pressure on the suction or discharge sides of the pump. It will be noted by tapering the ports in width and depth as clearly shown in Figure 6, the cross sectional area may be easily gaged in relation to the first mentioned cross sectional area and by providing separate ports $1^a$ which may be milled out a central partition $1^b$ is provided for forming a bearing surface for the outer portion 23 of the packing member 22, which also rides on the portions $1^c$ of the cylinder at opposite sides of the ports $1^a$. By forming the cross sectional area of the intake and discharge ports substantially the same as the cross sectional area of the chamber 2 above the rotor, it will be seen there will not be a back pressure, in other words the amount of material which may pass and be discharged is regulated to these cross sectional areas.

The invention having been set forth what is claimed as new and useful is:—

1. A rotary pump comprising an annular casing having a round chamber therein and its inner periphery transversely straight, a rotor eccentrically mounted in said casing, plates secured to opposite sides of the rotor and having drive shafts extending through the casing, abutments slidably mounted in the recesses in the rotor and substantially rectangularly shaped, L-shaped packing members disposed in channels of the abutments and having arms overlapped, springs carried by the abutments and engaging one of the overlapping arms and normally forcing said packing members outwardly, parallel slidable connecting rods connecting the abutments and detachably connected thereto, the connecting rods of the abutments intersecting each other.

2. The combination with a slidable abutment of a rotary pump, said abutment being slidably mounted in a recess of a rotor and cooperating with side and outer walls of the chamber of the pump casing, of L-shaped packing members, one of the arms of said L-shaped members being disposed in channels in opposite sides of the abutment, the other arms of the L-shaped members being overlapped and disposed in a channel in the outer end of the abutment and springs interposed between the overlapped arms and the bottom of the channel.

In testimony whereof I hereunto affix my signature.

EMMETT CASKEY.